Patented Apr. 12, 1949

2,467,164

UNITED STATES PATENT OFFICE 2,467,164

ACID INHIBITORS

Harold R. Slagh, Midland, Mich., assignor to The Dow Chemical Company, Midland, Mich., a corporation of Delaware No Drawing. Application July 29, 1944, Serial No. 547,309

10 Claims. (Cl. 23—154)

1

This invention relates to acid inhibitors, more particularly to inhibitors obtained by heating sulfur with unsaturated hydrocarbons and by oxidizing the products of the sulfurization.

The use of inhibitors which reduce the rate of action of non-oxidizing mineral acids on ferrous metals is of great importance commercially, particularly in the pickling of iron and steel articles, the acidizing of oil, water, or gas wells, and the cleaning of pipes, boilers, and the like. A great many substances show a mild inhibiting action and a few are fairly efficient in this respect. Among the latter are arsenic compounds, nitrogen bases, such as may be isolated in impure form from coal tar, and mercaptans. An inhibitor, to be of value, should be available at low cost and effective in low concentrations. For certain purposes, e. g. in acidizing deep wells, it often is important that the inhibitor be effective at high temperatures. Also, for many purposes it should not be unduly poisonous or obnoxious to handle. Most of the acid inhibitors heretofore available commercially are deficient in one or more of these respects.

I have found that liquid products resulting from the reaction of elemental sulfur at elevated temperatures with unsaturated hydrocarbons containing at least six carbon atoms in the molecule as well as substances obtained by the oxidation of these reaction products are very effective inhibitors of the action of non-oxidizing mineral acids on ferrous metals and are effective at higher temperatures than are the inhibitors heretofore available, even when used in small amounts.

As just stated, certain of these new inhibitors are prepared by heating the unsaturated hydrocarbons with elemental sulfur, a process herein designated as sulfurization, the resulting products being designated as sulfurized unsaturated hydrocarbons. Others of the new inhibitors are obtained by oxidizing the sulfurized unsaturated hydrocarbons, e. g. by means of nitric acid, and are, by way of convenience, herein referred to as oxidized sulfurized unsaturated hydrocarbons or simply as oxidation products of sulfurized unsaturated hydrocarbons.

The sulfurization is usually carried out to obtain liquid products by heating the unsaturated hydrocarbons or mixtures of the same, with from about 0.5 to about 4.0 molecular proportions of sulfur for from one to sixteen hours at temperatures between 100° and 250° C. The reaction temperature and time depend upon the ease with which the particular reaction involved takes place. The reaction is carried out conveniently

2 in an autoclave, preferably with agitation. Larger proportions of sulfur, higher temperatures, or a longer period of heating may be employed if desired, although under these conditions the products tend to be viscous oils or even resinous solids, and as such are not as readily employed as when prepared as indicated above. Smaller proportions of sulfur and less severe reaction conditions may also be employed if desired, although under these conditions the maximum inhibiting action of the product may not be developed. During the course of the reaction hydrogen sulfide may be evolved, particularly if more than one molecular proportion of sulfur is used. The pressure on the autoclave may be relieved from time to time by releasing the accumulated hydrogen sulfide. When prepared under the preferred conditions, the sulfurized unsaturated hydrocarbons are dark colored liquids only slightly soluble in water and having, usually, a specific gravity somewhat greater than that of water. Little is known of the composition of these products other than that they contain between about 15 and 35 percent, usually between about 20 and about 30 per cent, of sulfur. They are soluble in a number of organic solvents, such as carbon tetrachloride, acetone, acetic acid, and kerosene.

The oxidation of the sulfurized unsaturated hydrocarbons may be carried out conveniently by dissolving the sulfurized product in an organic solvent which is not easily oxidized, such as carbon tetrachloride, acetic acid, ethylene dichloride, or kerosene, and then treating the solution with from one to two molecular proportions of an oxidizing agent, such as aqueous nitric acid or aqueous chromic acid, at somewhat elevated temperatures, e. g. at from 50° to 100° C. The mixture should be agitated during the addition of the oxidizing agent. Upon termination of the oxidation, the solution of the oxidation product in the organic solvent may be used directly as an inhibitor, if desired, or the solvent may be removed by vaporization under vacuum to obtain the oxidation product substantially undiluted with a solvent. The oxidation may, in some instances, be carried out without the aid of a solvent for the sulfurized unsaturated hydrocarbon although, in this instance, considerable tar formation usually occurs. For this reason, the use of a solvent is preferred. Little is known of the composition of the oxidation products. Their solubility characteristics are similar to those of the unoxidized sulfurized products. The specific gravity is usually increased somewhat during the oxidation and the percentage of sulfur in the compound is usually decreased to some extent. The oxygen content of the oxidized product is usually from about 3 to about 10 per cent. Analyses of the oxidation products by means of infrared absorption spectra show them to contain little or no compounds containing sulfoxide radicals. Generally speaking, the oxidation products are somewhat better inhibitors than are the sulfurized compounds from which they are prepared.

Among the sulfurized unsaturated hydrocarbons which, together with their oxidation products, are particularly effective as acid inhibitors are those obtained from cyclohexene, methylcyclohexene, 3-cyclohexyl-cyclohexene, dipentene, alpha pinene and turpentine oil. Other sulfurized unsaturated hydrocarbons which also have inhibiting properties, although somewhat less effective than those noted above, are obtained by sulfurizing such unsaturated hydrocarbons as 3-phenyl-cyclohexene, styrene, diisobutylene, triisobutylene, a high-boiling unsaturated portion of a naphtha base petroleum, referred to commercially as naphthenic oil, and a high boiling unsaturated fraction isolated from the mixture obtained by cracking kerosene or fuel oil, said fraction, herein designated as alkylene oil, having a specific gravity of about 0.981 at 20° C. and boiling over the range 111° to 113° C. at 150 mm. pressure.

Table No. 1, which follows, illustrates the properties of, and the reaction conditions for, the preparation of several representative sulfurized unsaturated hydrocarbons characterized by their high effectiveness as acid inhibitors. Others unsaturated hydrocarbons may be sulfurized readily in the same general manner.

tone, kerosene, and a number of other organic solvents. Infrared absorption spectra of the product showed it to be substantially free of compounds having the sulfoxide radical.

When used as acid inhibitors, the sulfurized unsaturated hydrocarbons or their oxidation products are simply added to the aqueous non-oxidizing mineral acid, e. g. hydrochloric, sulfuric, or phosphoric acid, at any time prior to its use. Although the degree of inhibition is dependent to some extent upon the amount of inhibitor present and upon the effectiveness of the individual inhibitor used, nearly complete inhibition of the reaction of aqueous non-oxidizing mineral acids with ferrous metals may be accomplished by the addition of less than 2.0 per cent, and usually less than 1.0 per cent, of the inhibitor based upon the weight of the aqueous acid. In many instances the inhibitor is effective at concentrations as low as 0.2 per cent. Slight agitation of the mixture of acid and inhibitor is desirable, although not essential, since in use the mixture will ordinarily be agitated sufficiently. The undissolved portion of the oily inhibitor is thus dispersed throughout the body of the liquid and tends to remain in this desirable condition, particularly when the specific gravity of the inhibitor and the aqueous acid are approximately equal.

These new inhibitors are particularly valuable since they are effective, not only at ordinary temperatures, but at temperatures as high as 200° F. This effectiveness at higher temperatures is of great advantage since it allows well treating, pickling and other cleaning operations with acids to be carried out at higher temperatures than is possible with other inhibitors, thus shortening TABLE No. 1

| Unsaturated Hydrocarbon Sulfurized | Reaction Conditions | | Mols S per Mol Hydrocarbon | Properties of Product | |
|---|---|---|---|---|---|
| | Temp. (° C.) | Time (hrs.) | | Sp. Gr. at 30° C. | Percent S |
| Cyclohexene | 185 | 12 | 1 | 1.070 | 28.01 |
| 3-Vinyl-Cyclohexene | 175 | 12 | 1 | 1.084 | 22.01 |
| Methyl-Cyclohexene | 185 | 12 | 1 | 1.058 | 25 |
| Turpentine Oil (Approx. Empirical forumla $C_{10}H_{10}$) | 200 | 4 | 2.68 | 1.1165 | 29.15 |
| Dipentene | 175 | 10 | 2 | 1.067 | 27.42 |
| Alkylene Oil | 145 | 1.5 | ¹0.6 | 1.169 | 24.25 |
| Styrene | 155 | 3.5 | 1 | 1.142 | 23.95 |

¹ Approximate.

The oxidation of the sulfurization product of turpentine is illustrative of the general manner in which oxidation products of other sulfurized unsaturated hydrocarbons may be prepared. Thus 200 grams of the sulfurization product of turpentine having a specific gravity of 1.1165 and a sulfur content of 29.15 per cent was dissolved in 110 grams of ethylene dichloride and heated to 70° C. with stirring. 80 grams of 35 per cent aqueous nitric acid was added over a period of one-half hour at a temperature of 75–80° C. Cooling was required to remove the heat of reaction and brown fumes were evolved from the mixture. After heating for an additional one-half hour at 75° C., the mixture was allowed to stand and the aqueous layer which separated was discarded. 285 grams of oily solution were obtained. The product, after removal of the ethylene chloride by evaporation under vacuum, contained 20.42 per cent of sulfur and 5.8 per cent of oxygen. It was a thick dark oil insoluble in water and soluble in ethylene dichloride, carbon tetrachloride, acetic acid, acethe time required for the operation and in many instances permitting attack by the acid of undesirable substances which are not attacked at lower temperatures. Other mineral acids of a non-oxidizing character in addition to those mentioned, as well as acid reacting salts, such as sodium hydrogen sulfate, calcium chloride, and the like may be similarly inhibited.

Certain advantages of the invention will be seen from the following example, which is illustrative and not to be construed as limiting the invention.

*Example*

A series of tests were conducted on the effectiveness of a number of acid inhibitors prepared by sulfurizing unsaturated hydrocarbons and by oxidizing certain of the sulfurized unsaturated hydrocarbons. The results of these tests are summarized in the following Tabe No. 2. In conducting each test, 150 milliliters of an aqueous acid of the indicated composition and concentration, together with the indicated amount of the inhibitor named, were placed in an erlenmeyer flask. A strip of mild steel measuring approximately 2¾ inches by 1 inch by ⅛ inch and weighing approximately 47 grams was carefully cleaned to remove all rust and dirt, dried, weighed accurately, and totally immersed in the aqueous acid in the flask. The flask was covered loosely with a watch glass and maintained at the indicated temperature for the length of time noted. The strip of mild steel was then removed, washed with distilled water, dried and the loss in weight due to attack of the acid on the metal determined by reweighing. The loss in weight in pounds per day per square foot of surface was calculated. This value was compared with the corresponding value obtained in a duplicate determination carried out under similar conditions, but omitting the inhibitor. From the values obtained in these comparative determinations, the percentage effectiveness of the inhibitor was calculated in accordance with the equation:

$$\% \text{ Effectiveness} = \frac{100(L_u - L_i)}{L_u}$$

wherein $L_u$ is the loss in weight of the metal strip in the uninhibited and $L_i$ is the loss in weight of the strip in the inhibited acid.

2. A composition comprising an aqueous non-oxidizing mineral acid solution and a liquid sulfurized hydrocarbon formed by direct reaction of sulfur with an olefinic hydrocarbon having at least six carbon atoms in the molecule, which sulphurized hydrocarbon contains between 15 and 35 per cent by weight of chemically combined sulphur.

3. A composition comprising an aqueous non-oxidizing mineral acid solution and a liquid product prepared by heating, at temperature between 100° and 250° C., sulfur together with an olefinic hydrocarbon having at least six carbon atoms in the molecule, which sulphurized hydrocarbon contains between 15 and 35 per cent by weight of chemically combined sulphur.

4. A composition comprising an aqueous non-oxidizing mineral acid solution and a liquid product prepared by heating one molecular proportion of an olefinic hydrocarbon having at least six carbon atoms in the molecule together with from 0.50 to 4.0 molecular proportions of sulfur for from 1 to 16 hours at a temperature between 100° and 250° C.

5. A composition comprising an aqueous non-oxidizing mineral acid solution and a relatively small proportion of a liquid product prepared by heating one molecular proportion of an olefinic TABLE No. 2

| Inhibitor Used | Per cent Inhibitor (Based on Wt. of Aqueous Acid) | Per cent Acid Used and Conc. | Temp. (°F.) | Exposure Time (hours) | Loss in Wt. of Test Strip, lbs./day/sq. ft. | Loss in Wt. of Check Strip, lbs./day/sq. ft. | Per cent Effectiveness of Inhibitor |
|---|---|---|---|---|---|---|---|
| Sulfurized 3-Vinyl-Cyclohexene | 0.2 | 5 HCl | 150 | 16 | 0.23 | 0.418 | 94.6 |
| Sulfurized Methyl-Cyclohexene | 1.0 | 15 HCl | 150 | 16 | 0.337 | 1.14 | 70.04 |
| Sulfurized — Turpentine Oil | 0.2 | 5 HCl | 150 | 16 | .0089 | 0.418 | 97.7 |
| Do | 0.3 | 5 HCl | 150 | 16 | .0099 | 0.418 | 97.5 |
| Do | 0.5 | 15 HCl | 150 | 16 | 0.041 | 1.025 | 96.0 |
| Do | 0.4 | 15 HCl | 175 | 16 | 0.064 | 1.42 | 95.5 |
| Do | 0.5 | 15 HCl | 175 | 16 | 0.051 | 1.42 | 96.5 |
| Do | 0.4 | 15 H₂SO₄ | 175 | 16 | 0.023 | 0.938 | 97.5 |
| Do | 0.5 | 15 H₂SO₄ | 175 | 16 | 0.0285 | 0.938 | 97.0 |
| Do | 0.4 | 15 H₃PO₄ | 175 | 16 | 0.0275 | 0.435 | 94.0 |
| Do | 0.5 | 15 H₃PO₄ | 175 | 16 | 0.017 | 0.435 | 96.0 |
| Sulfurized Dipentene | 0.2 | 5 HCl | 150 | 16 | 0.018 | 0.400 | 95.5 |
| Do | 0.3 | 5 HCl | 150 | 16 | 0.012 | 0.400 | 97.0 |
| Sulfurized Alkylene Oil | 0.5 | 15 HCl | 150 | 16 | 0.085 | 0.895 | 90.5 |
| Sulfurized Styrene | 0.2 | 5 HCl | 150 | 16 | 0.062 | 0.399 | 84.5 |
| Sulfurized and oxidized Turpentine | 0.4 | 15 HCl | 150 | 16 | 0.0318 | 1.38 | 97.7 |
| Do | 0.3 | 5 HCl | 200 | 16 | 0.0165 | 0.435 | 96.2 |
| Sulfurized and oxidized Dipentene | 0.2 | 5 HCl | 200 | 16 | 0.0085 | 0.425 | 98.0 |

Other modes of applying the principle of the invention may be employed instead of those explained, change being made as regards the materials employed, provided the ingredients stated by any of the following claims or the equivalent of such stated ingredients be employed.

I therefore particularly point out and distinctly claim as my invention:

1. A composition comprising an aqueous non-oxidizing mineral acid solution and a liquid product selected from the class consisting of liquid sulfurized hydrocarbons formed by a direct reaction of sulphur with olefinic hydrocarbons having at least six carbon atoms in the molecule which sulphurized hydrocarbons contain between about 15 and about 35 per cent by weight of chemically combined sulphur, and liquid products resulting from incomplete oxidation of said sulphurized hydrocarbons, which incompletely oxidized liquid products contain between about 3 and about 10 per cent by weight of chemically combined oxygen.

hydrocarbon having at least six carbon atoms in the molecule together with from 0.75 to 4.0 molecular proportions of sulfur for from 1 to 16 hours at a temperature between 100° and 250° C.

6. A composition comprising an aqueous hydrogen halide solution and a relatively small proportion of a liquid sulfurized hydrocarbon formed by direct reaction of sulfur with an olefinic hydrocarbon having at least six carbon atoms in the molecule, which sulphurized hydrocarbon contains between 15 and 35 per cent by weight of chemically combined sulphur.

7. A composition comprising an aqueous hydrochloric acid solution and a relatively small proportion of a liquid sulfurized hydrocarbon formed by direct reaction of sulfur with an olefinic hydrocarbon having at least six carbon atoms in the molecule, which sulphurized hydrocarbon contains between 15 and 35 per cent by weight of chemically combined sulphur.

8. A composition comprising an aqueous hydrochloric acid solution and a relatively small proportion of a liquid product, containing between 15 and 35 per cent by weight of chemically combined sulphur, which liquid product is formed by direct reaction of sulphur with turpentine oil.

9. A composition comprising an aqueous hydrochloric acid solution and a relatively small proportion of a liquid product, containing between 15 and 35 per cent by weight of chemically combined sulphur, which liquid product is formed by direct reaction of sulphur with vinyl cyclohexene.

10. The process for reducing the corrosive action of an aqueous non-oxidizing mineral acid solution on a ferrous metal, which comprises incorporating with the aqueous non-oxidizing mineral acid solution a liquid product selected from the class consisting of liquid sulfurized hydrocarbons formed by a direct reaction of sulfur with olefinic hydrocarbons having at least six carbon atoms in the molecule, which sulphurized hydrocarbons contain between about 15 and about 35 per cent by weight of chemically combined sulphur, and liquid products resulting from incomplete oxidation of said sulphurized hydrocarbons, which incompletely oxidized liquid products contain between about 3 and about 10 per cent by weight of chemically combined oxygen.

HAROLD R. SLAGH.

REFERENCES CITED

The following references are of record in the file of this patent:

UNITED STATES PATENTS

| Number | Name | Date |
|---|---|---|
| 1,630,101 | Wilkin | May 24, 1927 |
| 1,877,504 | Grebe et al. | Sept. 13, 1932 |
| 1,878,468 | Covell | Sept. 20, 1932 |
| 1,926,687 | Palmer et al. | Sept. 12, 1933 |
| 2,071,989 | Thomas | Feb. 23, 1937 |
| 2,094,590 | Donovan | Oct. 5, 1937 |
| 2,111,882 | Borglin | Mar. 22, 1938 |
| 2,179,061 | Smith | Nov. 7, 1939 |
| 2,217,874 | Merriam | Oct. 15, 1940 |
| 2,257,750 | Lincoln et al. | Oct. 7, 1941 |
| 2,279,688 | Larsen | Apr. 14, 1942 |
| 2,338,830 | Werntz | Jan. 11, 1944 |
| 2,344,833 | Rummelsburg | Mar. 21, 1944 |

OTHER REFERENCES

Glass et al., Chemical Abstracts, vol. 24, p. 87, (1930).

Nakatsuchi, Chemical Abstracts, vol. 25, p. 938, (1931).

Ellis, The Chemistry of Synthetic Resins, vol. 1, p. 780, Reinhold Pub. Co., New York (1935).